United States Patent
Seo et al.

(10) Patent No.: US 9,043,516 B2
(45) Date of Patent: May 26, 2015

(54) DATA STORAGE DEVICE AND OPERATING METHOD THEREOF

(71) Applicants: SK HYNIX INC., Icheon (KR); Industry-Academic Cooperation Foundation, Yonsei University, Seoul (KR)

(72) Inventors: Hyeok-Jun Seo, Seoul (KR); Seok-Min Ko, Seoul (KR); Eui-Young Chung, Seongnam (KR)

(73) Assignees: SK HYNIX INC., Icheon (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 119 days.

(21) Appl. No.: 13/927,729

(22) Filed: Jun. 26, 2013

(65) Prior Publication Data

US 2014/0006733 A1 Jan. 2, 2014

(30) Foreign Application Priority Data

Jun. 29, 2012 (KR) ........................ 10-2012-0070417

(51) Int. Cl.
G06F 3/06 (2006.01)
G06F 13/38 (2006.01)

(52) U.S. Cl.
CPC ............ *G06F 3/0604* (2013.01); *G06F 3/0611* (2013.01); *G06F 3/0649* (2013.01); *G06F 3/0685* (2013.01)

(58) Field of Classification Search
None
See application file for complete search history.

(56) References Cited

U.S. PATENT DOCUMENTS

2012/0209893 A1* 8/2012 Kim et al. ................ 707/822

FOREIGN PATENT DOCUMENTS

KR 10-2012-0012375 A 2/2012

OTHER PUBLICATIONS

Li-Pin Chang, "A Hybrid Approach to NAND-Flash-Based Solid-State Disks," IEEE Transactions on Computers, Oct. 2010, pp. 1337-1349, vol. 59, No. 10, IEEE Computer Society.

* cited by examiner

*Primary Examiner* — Scott Sun

(57) ABSTRACT

A data storage device includes a first memory device configured to store data having a first property, a second memory device configured to store data having a second property, and a controller. The controller selects data stored in the first memory device, and transfers the selected data to the second memory device or stores the selected data in another physical location of the first memory device selectively depending on an update count (UC) of an address at which the selected data is stored.

22 Claims, 11 Drawing Sheets

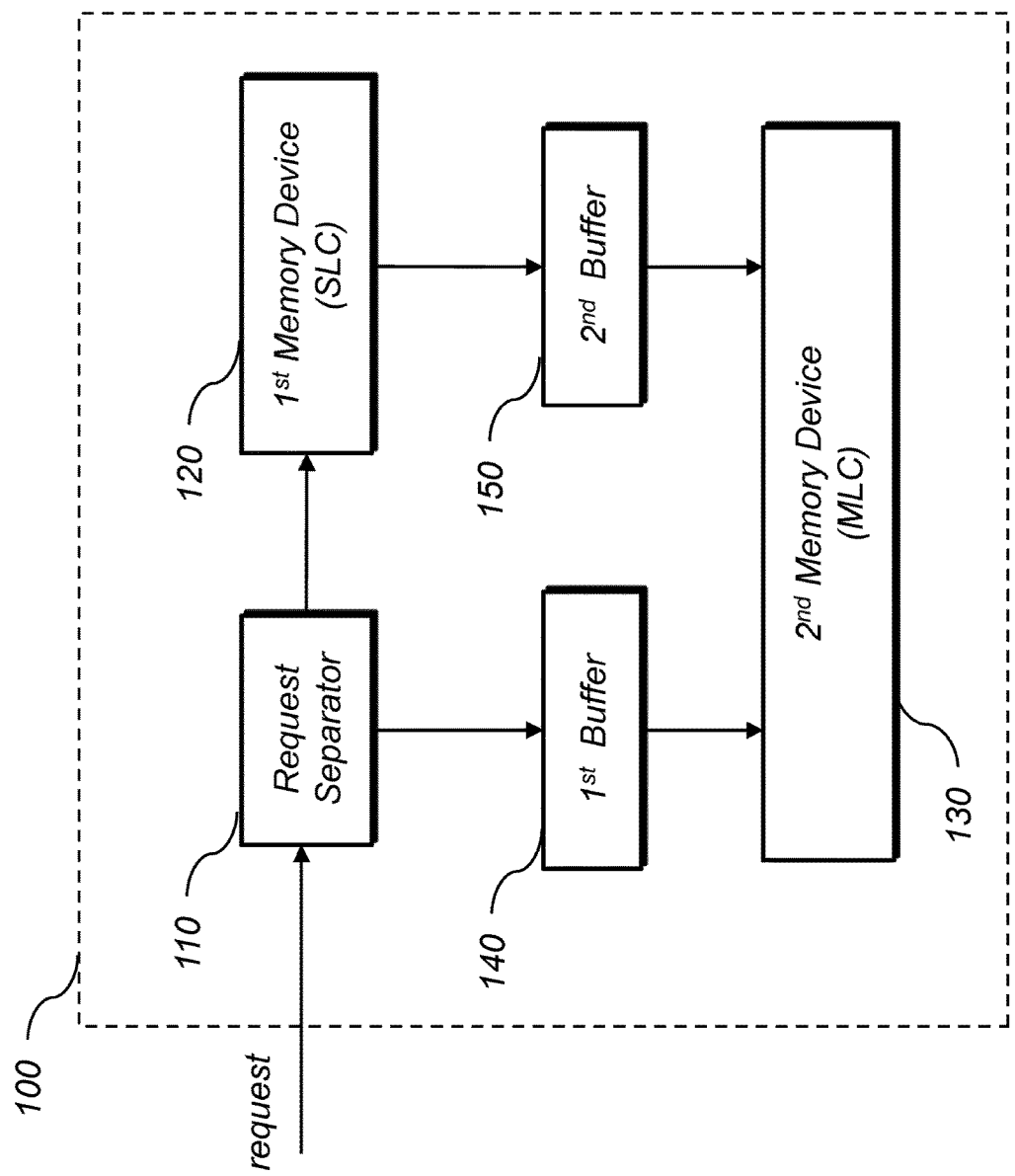

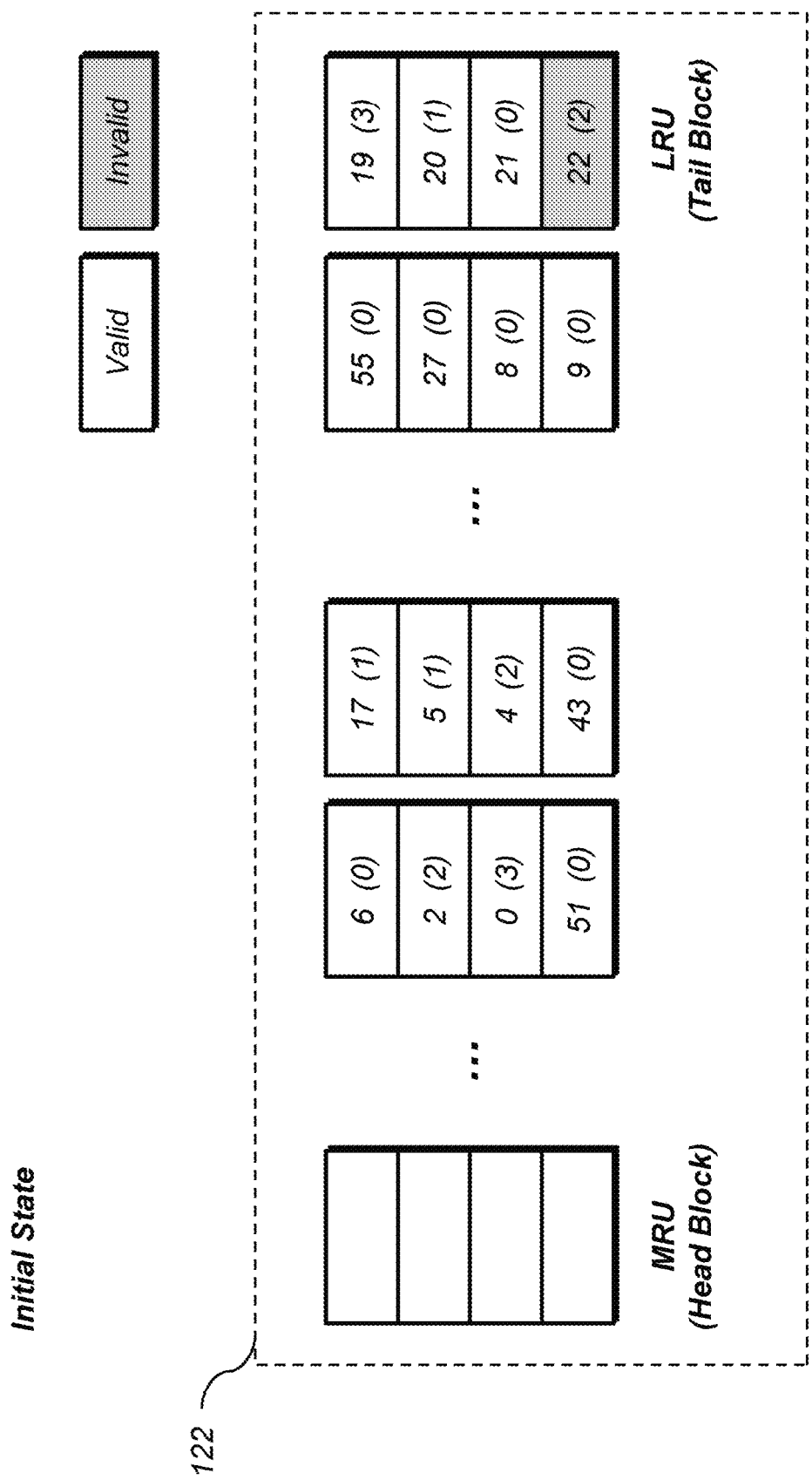

DATA STORAGE DEVICE AND OPERATING METHOD THEREOF

CROSS-REFERENCE TO RELATED APPLICATIONS

The present application claims priority of Korean Patent Application No. 10-2012-0070417, filed on Jun. 29, 2012, which is incorporated herein by reference in its entirety.

BACKGROUND

1. Field

Embodiments of the present invention relate to a data storage device and an operating method thereof, and more particularly, to a data storage device including two or more types of memory devices which classifies properties of data and selectively stores the data in the memory devices according to property, and a method of operating the same.

2. Description of the Related Art

Recently, much attention has been paid to a solid state drive (SSD) that includes a flash memory device as a data storage device to replace a hard disk drive.

Basically, a flash memory device cannot overwrite data. Therefore, in order to write new data at a physical location where data already exists, the existing data must be erased before the new data is written. In general, since a unit for a data erase operation (for example, a block including a plurality of pages) is larger than a unit for a data write operation (for example, a page), valid pages and invalid pages may coexist in one block. The valid pages represent pages storing valid data, and the invalid pages represent pages storing invalid data that is to be erased.

If the number of blocks including fewer valid pages than invalid pages increases, an available storage space of the flash memory device may decrease. Thus, in order to prevent such a problem, a garbage collection operation is performed on the blocks.

Flash memory devices include single-level-cell (SLC) memory devices and multi-level-cell (MLC) memory devices. An SLC memory device includes a plurality of SLCs each storing one bit, and a MLC memory device includes a plurality of MLCs each storing multiple bits. SLC memory devices have a higher operating speed than MLC memory devices, but have a higher price than MLC memory devices.

Therefore, there is a need for a data storage device that minimizes the disadvantages without compromising the advantages offered by both a high-speed memory device, such as an SLC memory device, and a high-capacity memory device, such as an MLC memory device.

SUMMARY

Various embodiments are directed to a data storage device including different types of memory devices and a method of operating the same.

In an embodiment, a data storage device includes: a first memory device configured to store data having a first property; a second memory device configured to store data having a second property; and a controller configured to select one or more data stored in the first memory device, and transfer the selected data to the second memory device or store the selected data to another physical location in the first memory device selectively depending on an update count (UC) of an address at which the data is stored.

The data storage device may further include a request separator configured to classify the property of data requested from outside into the first property or the second property.

The request separator may include: a first selection unit configured to classify the property of the data requested from outside into the first property or the second property depending on the length of the data; and a second selection unit configured to reclassify the property of the data, classified into the second property by the first selection unit, into the first property or the second property depending on a request count of the data.

The second selection unit may include: a first storage device configured to sequentially store addresses of the requested data according to a request sequence; and a second selection controller configured to reclassify data corresponding to a predetermined or more number of addresses existing in the first storage device into data having the first property.

The data storage device may further include: a first buffer configured to temporarily store the data classified into the first property; and a second buffer configured to temporarily store data which is to be transferred to the second memory device from the first memory device.

The data storage device may further include a third memory device configured to store the UC.

The first memory device may store the UC.

The selected data may include one or two or more data including data used the longest time ago in the first memory device.

The controller may transfer data, of which the UC is less than a threshold value, to the second memory device.

The controller may store data, of which the UC is equal to or more than a threshold value, at a different physical position of the first memory device.

The first memory device may include single-level cells (SLCs), and the second memory device may include multi-level cells (MLCs).

One or more of the first and second memory devices may include a nonvolatile memory device.

In an embodiment, an operating method of a data storage device includes: selecting one or more data in a first memory device storing data having a first property; and transferring the data to a second memory device storing data having a second property, depending on a UC corresponding to an address of the data.

The operating method may further include: classifying the properties of data requested from outside into the first property or the second property; and storing data classified into the first property in the first memory device, and storing data classified into the second property in the second memory device.

The classifying of the properties of the data may include: a first step of classifying the data requested from outside into the first property or the second property depending on the length of the data; and a second step of reclassifying the data, classified into the second property at the first step, into the first property or the second property depending on a UC of the data.

The second step may include: sequentially storing addresses of the requested data in a storage device having a predetermined length according to a request sequence; and reclassifying data corresponding to a predetermined or more number of addresses existing in the storage device into data having the first property.

The transferring of the data to the second memory device may include transferring the data to the second memory device when a UC corresponding to the address of the data is equal to or less than a threshold value.

The operating method may further include storing the data at a different physical position of the first memory device again, when the UC corresponding to the address of the data exceeds the threshold value.

The operating method may further include resetting a UC corresponding to the address of the data stored in the first memory device.

The operating method may further include, when new data is written to an address of valid data existing in the first memory device, increasing a UC corresponding to the address.

The selecting of the one or more data may include selecting one or two or more data including data used the longest time ago in the first memory device.

In an embodiment, a data storage device includes: a request separator configured to classify the properties of data requested from outside into a first property or a second property; a first memory device configured to store data classified into the first property; and a second memory device configured to store data classified in the second property.

The request separator may include: a first selection unit configured to classify the data requested from outside into the first property or the second property depending on the length of the data; and a second selection unit configured to reclassify the data, classified into the second property by the first selection unit, into the first property or the second property depending on a UC of the data.

The second selection unit may include: a first storage device configure to sequentially store addresses of the requested data according to a request sequence; and a second selection controller configured to reclassify data corresponding to a predetermined or more number of addresses existing in the first storage device into the first property.

BRIEF DESCRIPTION OF THE DRAWINGS

FIG. 1 is a block diagram illustrating a data storage device according to an embodiment of the present invention.

FIGS. 5A to 5E are diagrams illustrating an operating method of the data storage device according to an embodiment of the present invention.

DETAILED DESCRIPTION

Figure 2A:
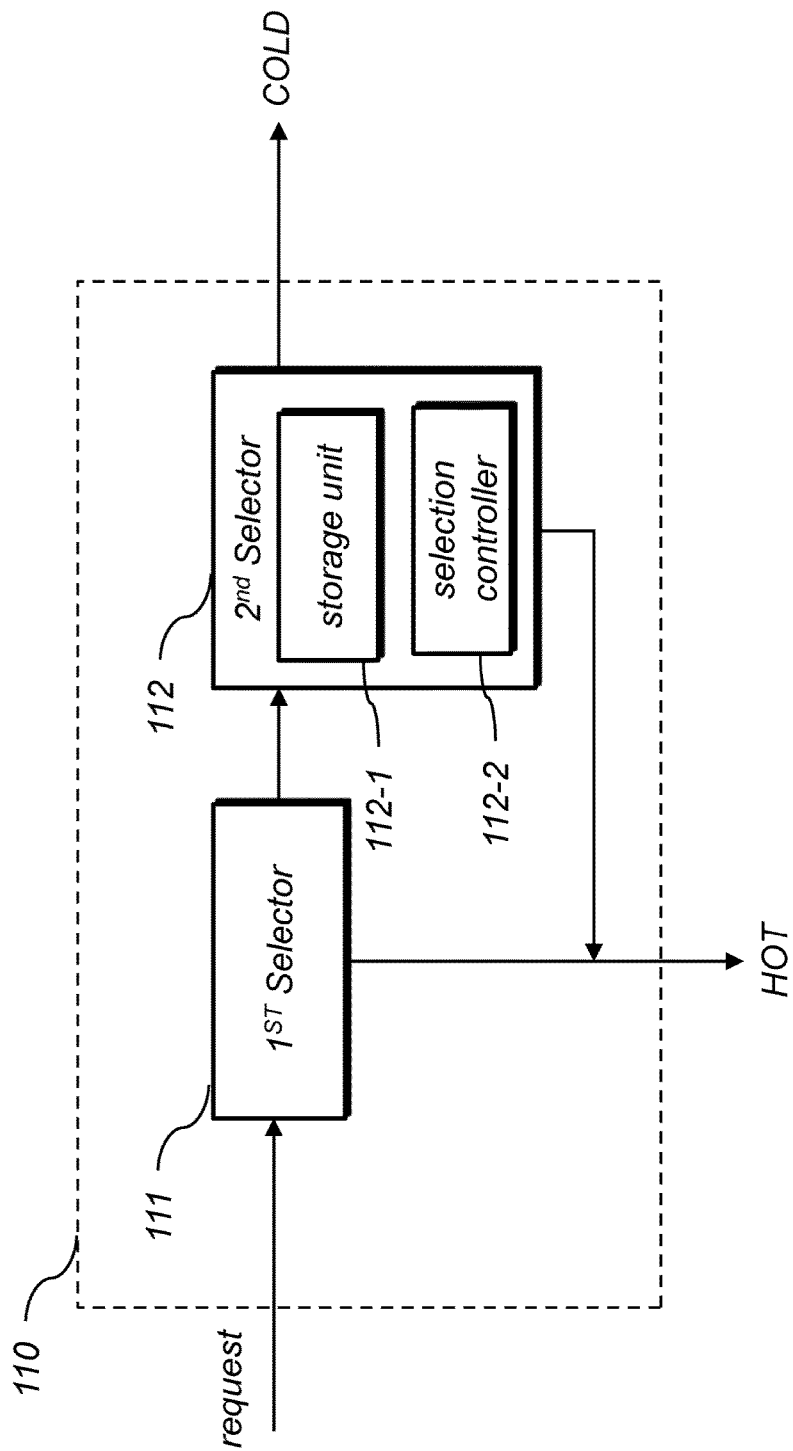
FIG. 2A illustrates a block diagram of a request separator of FIG. 1 according to an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In general, a hot property of a logical address indicates that the logical address is requested more frequently, and a cold property indicates that the logical address is requested less frequently.

Hereafter, data stored at a logical address having a specific property may be referred to as data having the specific property. For example, data having a hot property indicates that a logical address at which the data is stored has the hot property.

In embodiments of the present invention, a logical page address is used as an example of a logical address. However, a unit of a logical address is not limited to a logical page address. Other units may be used depending on the applied mapping technology. As referred to herein, a logical page address represents an address designating a page.

FIG. 1 is a block diagram illustrating a data storage device 100 according to an embodiment of the present invention.

The data storage device 100 includes a request separator 110, a first memory device 120, and a second memory device 130. The request separator 110 selects one of the first and second memory devices 120 and 130 according to a property of data that is requested. The first memory device 120 stores data having a hot property. The second memory device 130 stores data having a cold property.

In an embodiment of the present invention, the first memory device 120 is implemented with an SLC memory device having a relatively high operating speed, and the second memory device 130 is implemented with an MLC memory device having a relatively large storage capacity.

The data storage device 100 further includes a first buffer 140 and a second buffer 150. The first buffer 140 temporarily stores data provided from the request separator 110 before the data is written into the second memory device 130. The second buffer 150 temporarily stores data transferred from the first memory device 120 before the data is written into the second memory device 130.

The data storage device 100 stores data having a hot property in the first memory device 120. In an embodiment of the present invention, data not being longer than a predetermined length or being accessed more frequently than a predetermined number of times is classified as data having a hot property, and data being longer than the predetermined length and being accessed less frequently than a predetermined number of times is classified as data having a cold property.

If a property of data stored in the first memory device 120 is changed to a relatively cold property based on use, the first memory device 120 transfers the data to the second memory device 130.

Such a configuration may improve the performance of the data storage device 100 including the first and second memory devices 120 and 130. This will be described in detail with reference to FIG. 4.

FIG. 2A illustrates a block diagram of the request separator 110 according to an embodiment of the present invention. The request separator 110 includes first selector 111 and second selector 112. The first selector 111 classifies a property of data requested from outside into a hot property or a cold property according to a length of the data requested from outside. The second selector 112 reclassifies the data, which the first selector 111 had classified as having the cold property, as data having the hot property or data having the cold property according to a request count of the data.

The second selector 112 includes a storage unit 112-1 configured to sequentially store logical page addresses (LPAs) of the data requested from outside according to a request sequence. The second selector 112 also includes a selection controller 112-2 configured to reclassify data corresponding to a predetermined or more number of LPAs existing in the storage device into data having the hot property.

Figure 2B:
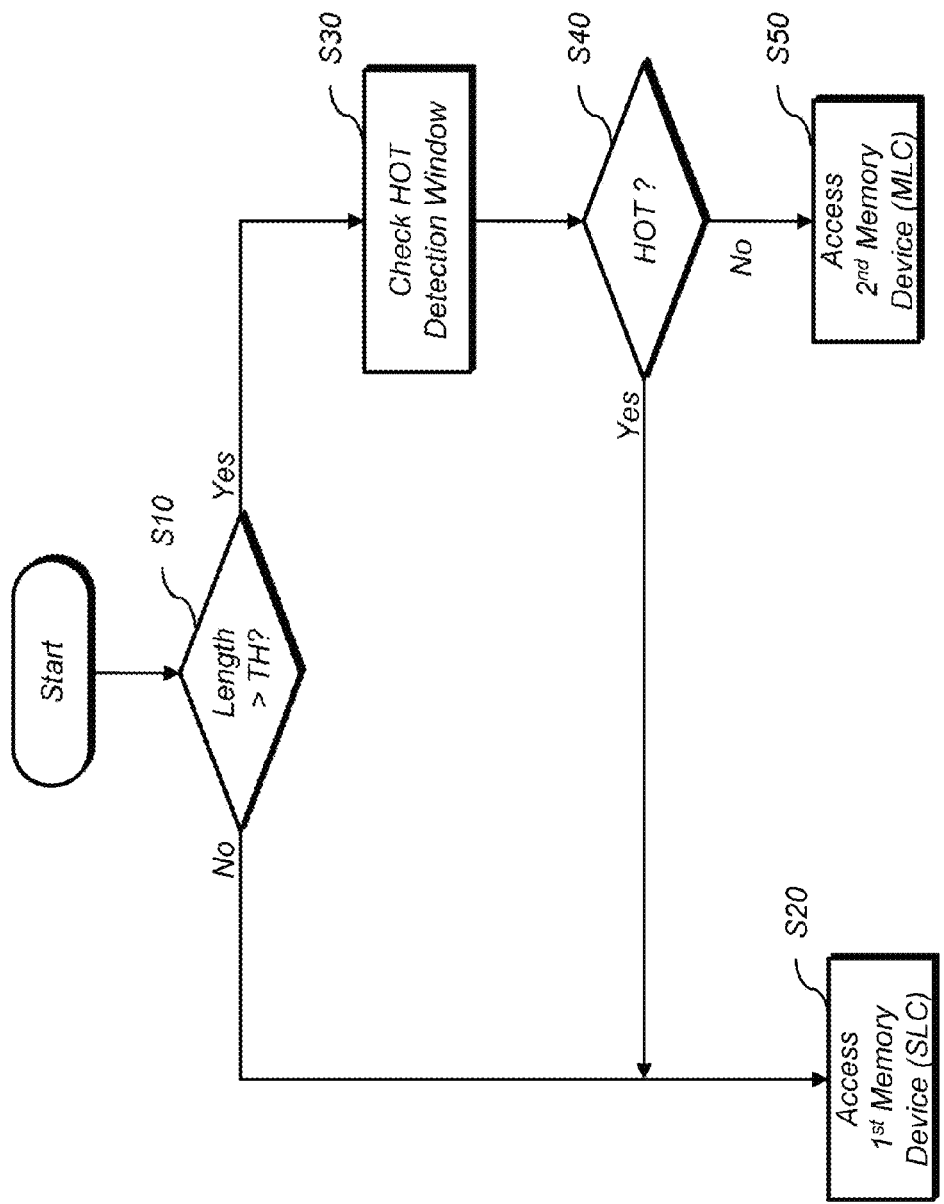
FIG. 2B is a flowchart illustrating an operating method of the request separator according to an embodiment of the present invention.

FIG. 2B is a flowchart illustrating an operating method of the request separator 110 according to an embodiment of the present invention.

The request separator 110 selects one of the first and second memory devices 120 and 130 to store data that is requested to be written into the data storage device 100.

If a data write request is made, the request separator 110 determines whether or not a length of the requested data exceeds a threshold value, at step S10.

If the length of the requested data is equal to or less than the threshold value, the request separator 110 determines that the requested data has a hot property, and stores the requested data in the first memory device 120, that is, an SLC memory device, at step S20.

On the other hand, if the requested data has a length exceeding the threshold value, the requested data is initially classified as data having a relatively cold property. However, such data is subjected to a second classification process.

In accordance with an embodiment of the present invention, for performing the above operation, the storage unit 112-1 may have a queue structure with a predetermined length, and sequentially inputs requested data to a queue in the queue structure. The queue structure having the predetermined length may be referred to as a hot detection window.

The selection controller 112-2 checks the queue at step S30. Then, the selection controller 112-2 compares a value associated with a number of times the data existing at a certain logical address within the queue is accessed with a reference value, and determines again whether or not the data has a hot property, at step S40.

If the number of times is equal to or greater than the reference value, it means that access to the certain logical address occurs frequently. Thus, the frequently accessed data may be stored in the first memory device 120 having a relatively higher operating speed in order to improve the performance of the data storage device 100.

In this way, the data determined to have a hot property is stored in the first memory device 120 at step S20, and other data having a cold property is stored in the second memory device 130 at step S50.

As described above, the request separator 110 selects one of the first and second memory devices 120 and 130 when data is initially input to the data storage device 100.

For example, when a flash memory device, which has a unit for a data write operation (for example, a page) that is different from a unit for a data erase operation (for example, a block), is used, data cannot be overwritten, and thus physical locations of data may not be constantly maintained in the flash memory device. As a result, the property of the data determined when the data is initially stored may be changed over time.

Figure 3:
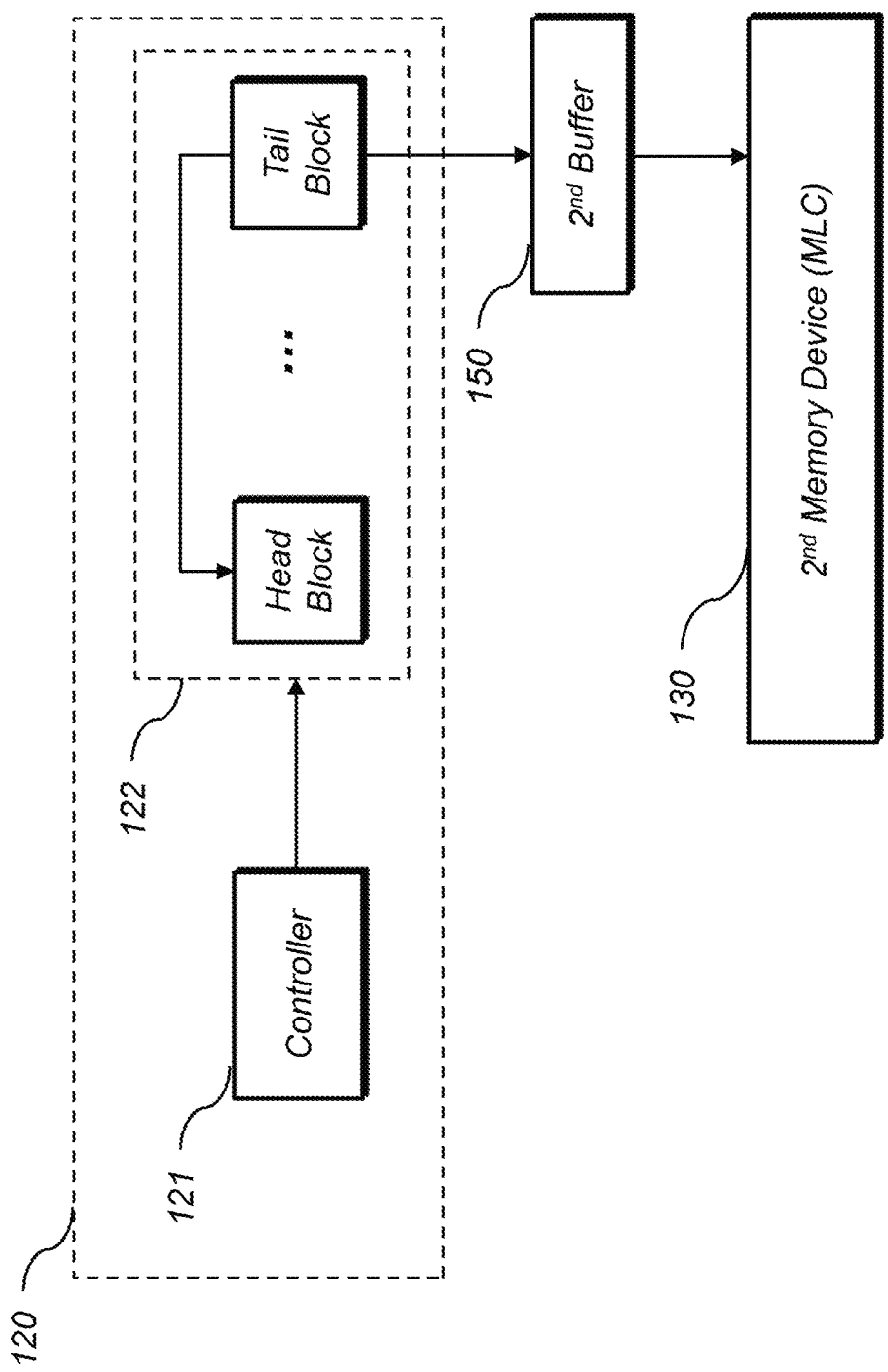
FIG. 3 is a block diagram illustrating a first memory device according to an embodiment of the present invention.

FIG. 3 is a block diagram illustrating the first memory device 120 according to an embodiment of the present invention.

The first memory device 120 includes a memory block 122 and a controller 121 configured to control an operation of the memory block 122.

The controller 121 controls a garbage collection operation of the first memory device 120. In an embodiment, the first memory device 120 operates according to a page level mapping method.

In this embodiment, the controller 121 is positioned in the first memory device 120. In another embodiment, the controller 121 may be provided outside the first memory device 120.

The memory block 122 includes a plurality of blocks including a head block and a tail block. Among the plurality of blocks, the block that has not been used for the longest time is designated as the tail block, and a currently available block is designated as the head block. A data write operation is performed on the head block.

However, when the head block has no extra space such that the data write operation cannot be performed thereon any more, one of free blocks in the memory block 122 is designated as a new head block.

The controller 121 controls a garbage collection operation for the memory block 122. The controller 121 determines a property of data of a page during the garbage collection operation of the first memory device 120.

Data of a page determined to have a hot property is stored again in the head block of the first memory device 120, and data of a page determined to have a cold property is transferred to the second memory device 130. At this time, the data to be transferred to the second memory device 130 is temporarily stored in the second buffer 150.

In this embodiment, the property of a page is determined by considering an amount of time passing after data was written in the page and an update count of the page.

The garbage collection operation is performed on the tail block by considering the amount of time passing after data was written in the page. In an embodiment, the tail block is a block including a page storing the oldest data, i.e., data that was written the longer ago than data in any other block. The oldest block, i.e., the tail block, may have a higher number of invalidated pages than other blocks. Thus, when the garbage collection operation is performed on the tail block, the garbage collection cost may be reduced.

Furthermore, among valid pages of the tail block, a number of pages having a cold property may be relatively higher than a number of pages having a hot property. Thus, it is easier to filter pages having a relatively cold property in the first memory device 120.

In an embodiment, the garbage collection operation is performed only on the tail block. In another embodiment, however, the garbage collection operation may be performed on one or more blocks including the tail block.

In an embodiment, an update count (UC) for each logical page address (LPA) is determined to consider how many times a page was updated.

When data is initially written into a certain LPA, a UC corresponding to the LPA is reset to 0. Then, whenever a new data write request for the LPA is made, the UC is increased by one.

In order to determine if data has a hot or a cold property, a predetermined threshold UC value may be set. When the UC is higher than the predetermined threshold UC value, it means that data of a corresponding LPA is frequently changed. Thus, the LPA is determined to have a hot property.

On the other hand, when the UC is lower than the predetermined threshold UC value, it means that data of a corresponding LPA is not changed frequently. Thus, the LPA is determined to have a cold property.

The tail block on which the garbage collection operation has been completely performed may be designated as a free block to write new data, and the block that has not been used for the longest time among other used blocks is designated as a new tail block.

Figure 4:
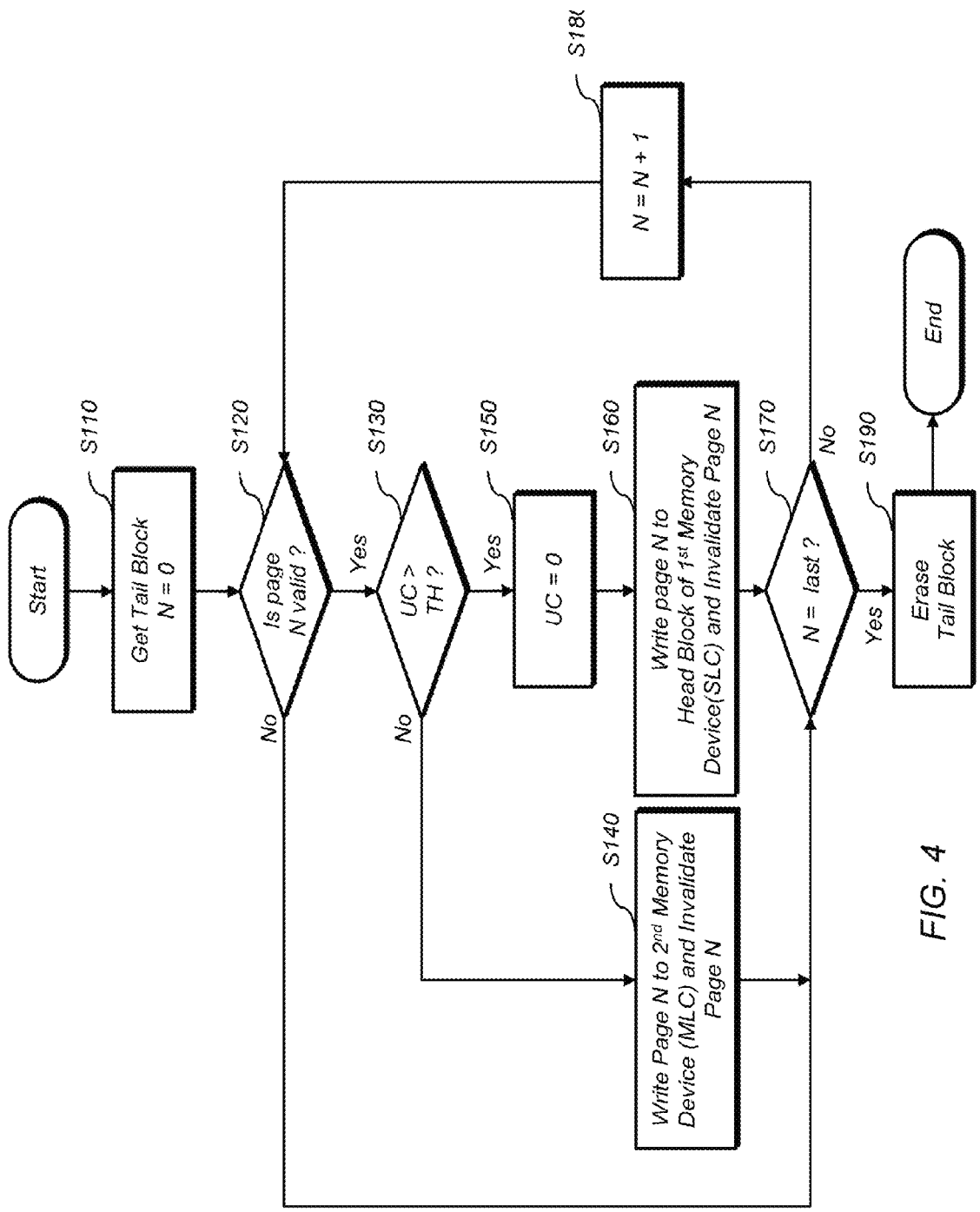
FIG. 4 is a flowchart illustrating an operating method of the data storage device according to an embodiment of the present invention.

FIG. 4 is a flowchart illustrating a garbage collection operation for the first memory device 120, which is performed by the controller 121, according to an embodiment of the present invention.

When the garbage collection operation starts, the controller 121 searches for a tail block in a block table, and designates a first page of the tail block at step S110. At this point, the first page is designated as a currently selected page.

The controller 121 determines whether or not the currently selected page is a valid page, at step S120.

When the currently selected page is not a valid page, the controller 121 moves to the next page through steps S170 and S180 as long as the currently selected page is not the last page of the tail block.

When the currently selected page contains valid data, the controller 121 determines whether or not a UC corresponding to an LPA of the currently selected page exceeds a threshold value, at step S130.

When the UC exceeds the threshold value, the controller 121 determines that the currently selected page has a relatively hot property, and resets the UC to 0 at step S150. Then, the controller 121 writes data of the currently selected page into a head block of the memory block 122 and the controller 121 invalidates the currently selected page at step S160.

When the UC does not exceed the threshold value, the controller 121 determines that the currently selected page has a relatively cold property, and transfers and writes the data of the currently selected page into the second memory device 130 and the controller 121 invalidates the currently selected page at step S140.

Then, if the currently selected page is determined to be the last page at step S170, the controller 121 erases data stored in the tail block, and changes the tail block to a free block at step S190 and ends the garbage collection operation. If the currently selected page is not determined to be the last page at step S170, the procedure moves to step S180 to perform the garbage collection operation on the next page.

Among data determined to be hot data at the initial stage of the data write operation and stored in the first memory device 120, data whose property changes to a relatively cold property is transferred to the second memory device 130 through the garbage collection operation.

FIGS. 5A to 5E are diagrams illustrating the operating method of the first memory device 120 according to an embodiment of the present invention.

FIG. 5A illustrates an initial state of the memory block 122. In FIG. 5A, one block includes four pages. In FIG. 5A, the number in front of parentheses in each page represents an LPA, and the number in parentheses in each page represents a UC.

In FIG. 5A, a gray page represents an invalid page that stores invalid data, and a white page represents an empty page that stores no data.

Figure 5B:
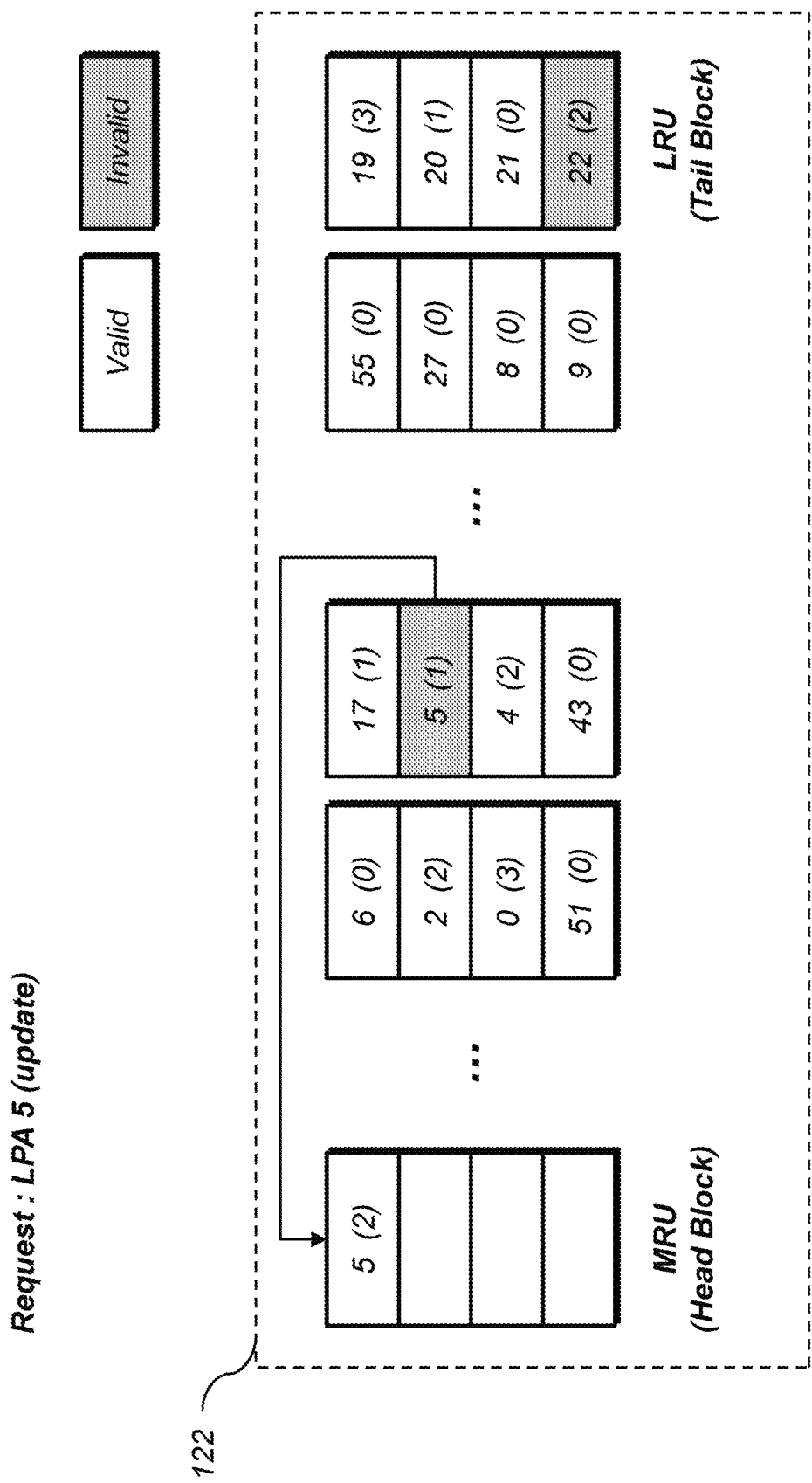

FIG. 5B illustrates an operation of writing new data at an existing LPA of the first memory device 120. An existing LPA 5 has a UC of 1. Thus, when new data corresponding to the LPA 5 is written into the first memory device 120, the new data is written into a head block, and the UC is increased to 2 from 1.

Figure 5C:
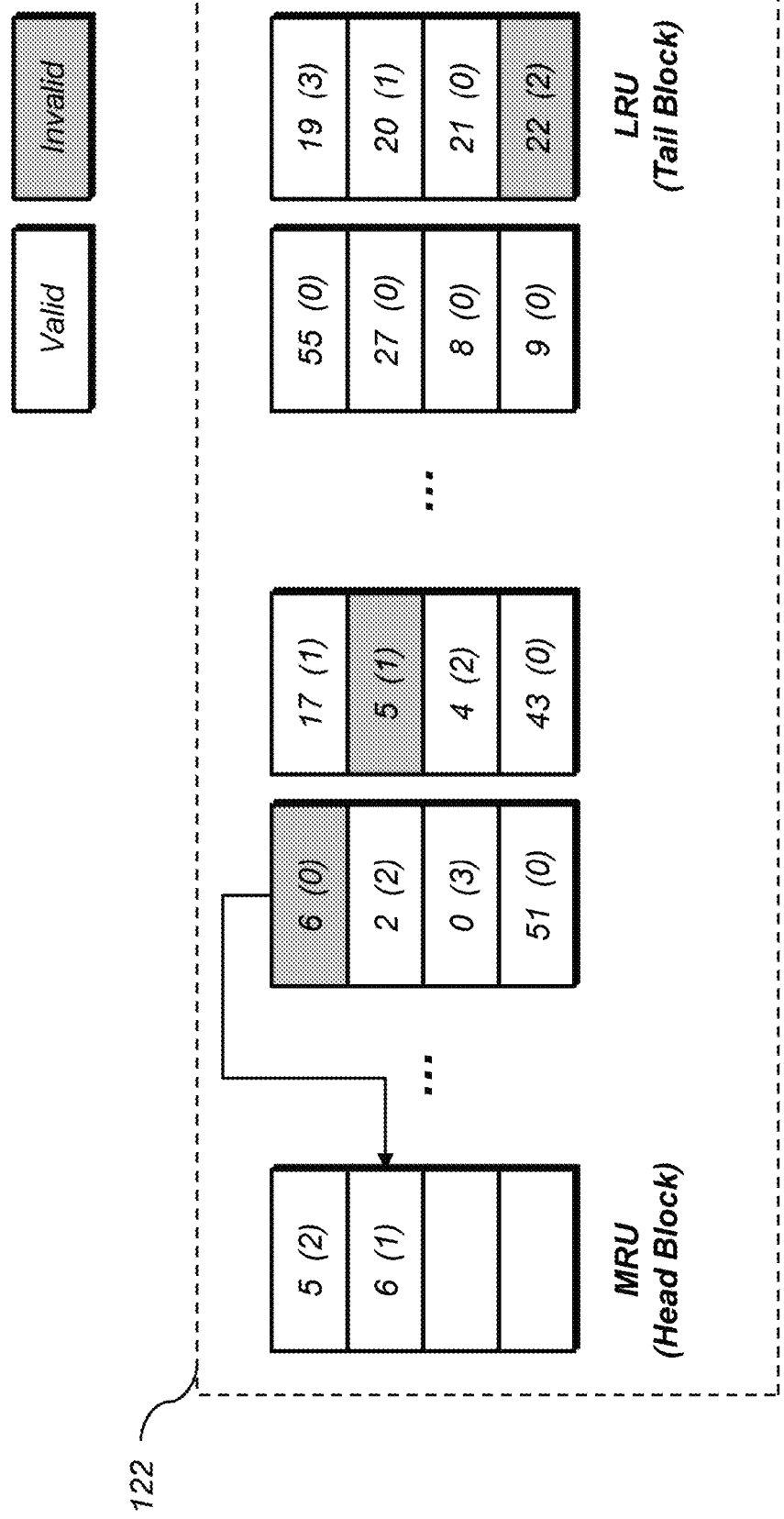

FIG. 5C also illustrates an operation of writing new data at an existing LPA. An existing LPA 6 has a UC of 0. Thus, when new data corresponding to the LPA 6 is written, the new data is written into the head block, the UC becomes 1, which represents an increase by one from 0.

Figure 5D:

FIG. 5D illustrates an operation of writing data at an LPA that has not been used. An LPA 11 represents an address at which new data can be written. Thus, the new data is written into the head block, the UC of the LPA 11 is reset to 0.

Figure 5E:
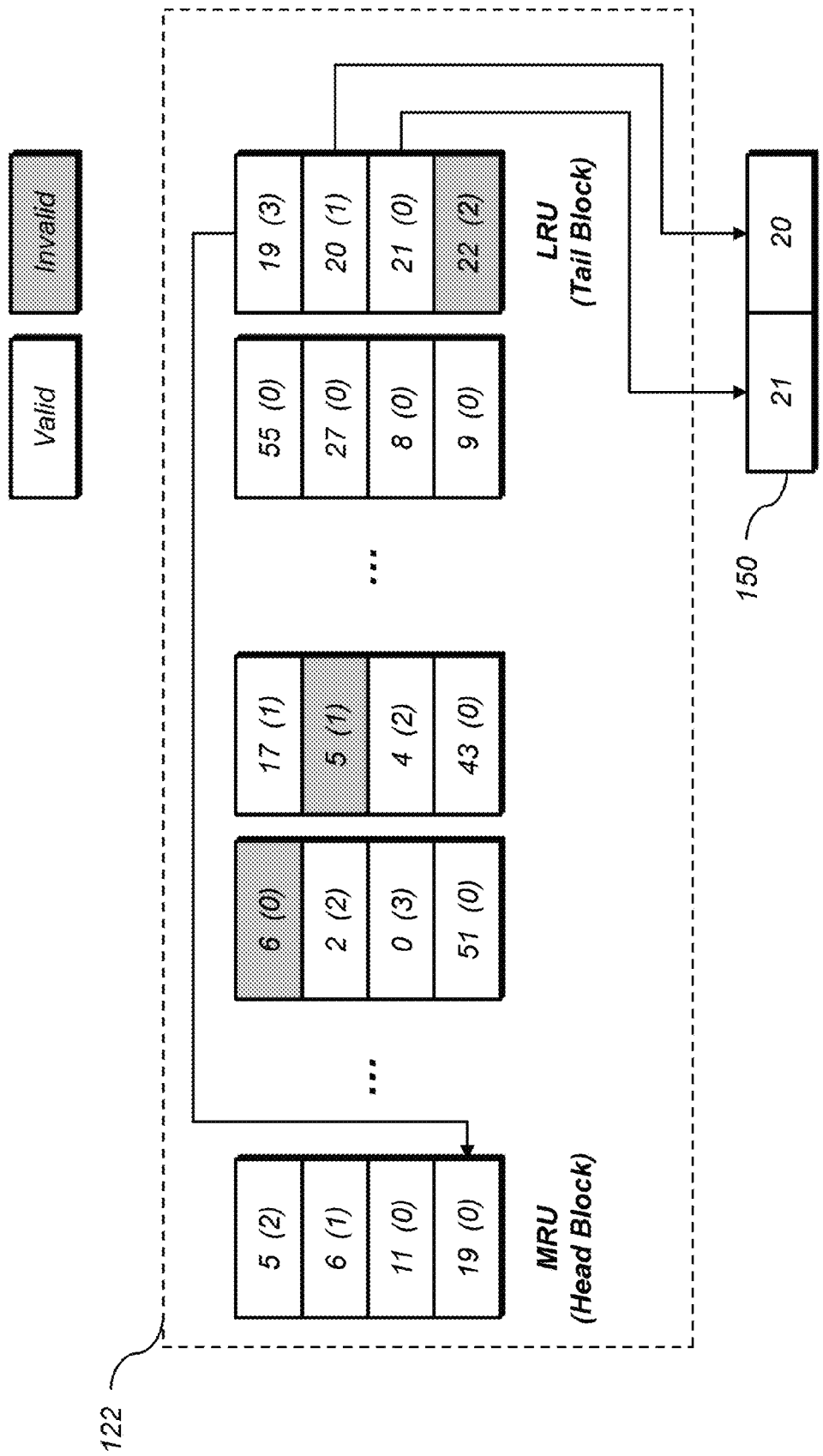

FIG. 5E illustrates a garbage collection operation performed on a tail block. In this embodiment, a threshold value of the UC has a value '1'. In another embodiment, a different threshold value may be used.

UCs of valid pages in the tail block are sequentially compared with the threshold value '1'.

Since the UC of an LPA 19 is 3, which exceeds the threshold value '1', data at the LPA 19 is written into the head block of the first memory device 120, and the UC of the LPA 19 in the head block is reset to 0.

Herein, since the UC of an LPA 20 is 1 and the UC of an LPA 21 is 0, the UCs are equal to or less than the threshold value '1'. Thus, data at the LPA 20 and the LPA 21 are temporarily stored in the second buffer 150 and then transferred to the second memory device 130.

Figure 6:
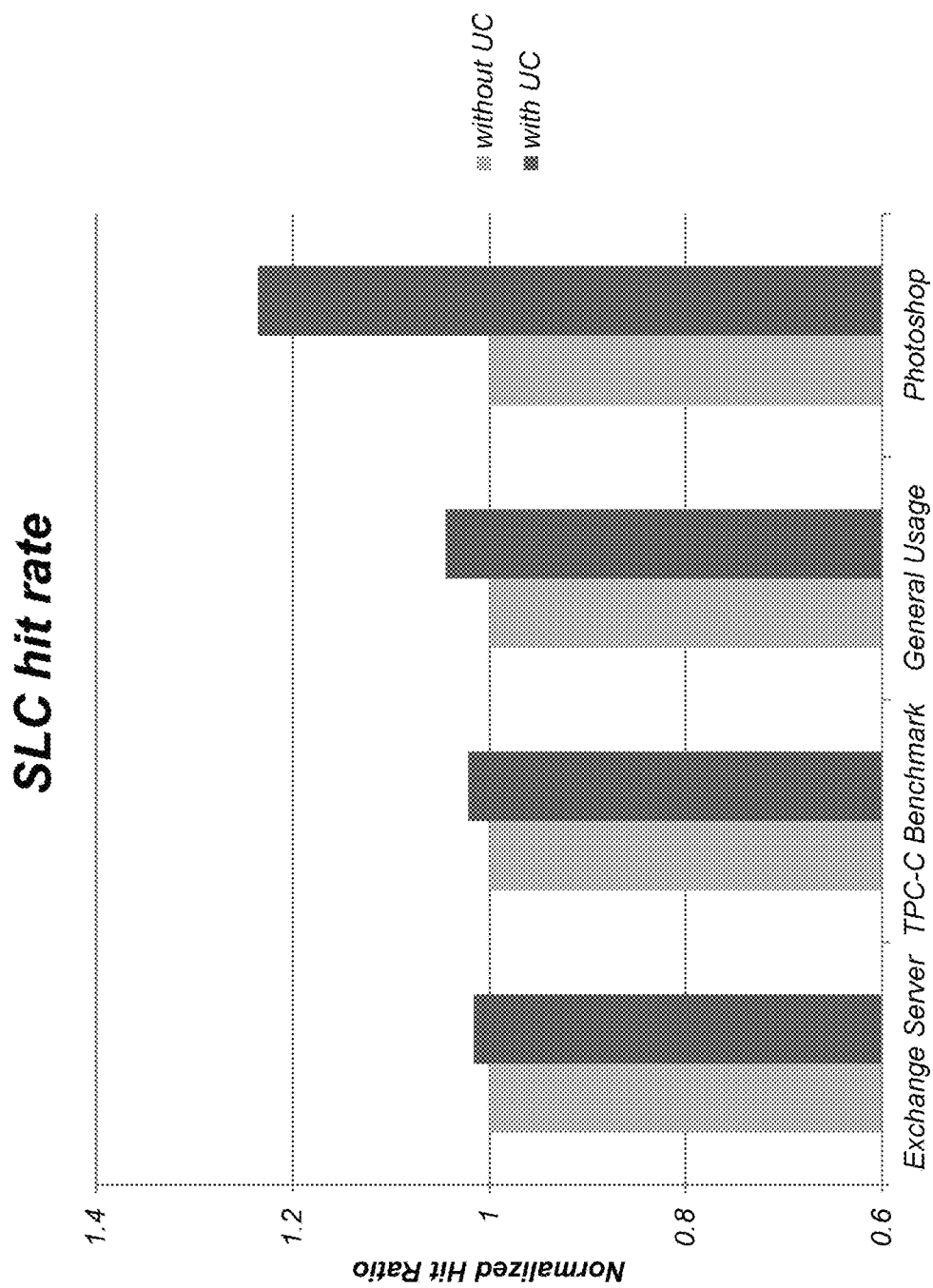
FIG. 6 is a diagram illustrating a simulation result obtained by testing the performance of a data storage device according to an embodiment of the present invention.

FIG. 6 is a diagram illustrating a simulation result showing an effect of the present invention.

In a test operation to obtain the simulation result, an SLC memory device having 512 blocks was used as the first memory device 120, and an MLC memory device having 1,024 blocks was used as the second memory device 130. The first memory device 120 has a higher operating speed than the second memory device 130. Thus, as a use rate of the first memory device 120 increases, the entire performance of the data storage device 100 may be improved.

In the test operation, when an external request was made, a hit rate was measured to check the performance. The hit rate indicates whether or not an LPA corresponding to the external request exists in the first memory device 120. As a result of the test operation, a hit rate when the UC is used in accordance with an embodiment of the present invention was improved over a hit rate when the UC is not used.

This is because data having a relatively cold property is transferred to the second memory device 130 from the first memory device 120, and thus a relatively large number of hot data are included in the first memory device 120.

Although various embodiments have been described for illustrative purposes, it will be apparent to those skilled in the art that various changes and modifications may be made without departing from the spirit and scope of the invention as defined in the following claims.

In particular, an SLC flash memory device and a MLC flash memory device have been taken as examples of the first and second memory devices. However, the first and second memory devices are not limited to a flash memory device or a semiconductor memory device.

It is obvious to those skilled in the art that the technical idea of the present invention may be applied to an arbitrary data storage device including a memory device having a relatively high operating speed and a memory device having a relatively large storage capacity, and the data storage device and an operating method thereof are included in the scope of the present invention.

What is claimed is:

1. A data storage device comprising:
   a first memory device configured to store data having a first property;
   a second memory device configured to store data having a second property; and
   a controller configured to select data stored at a certain physical location of the first memory device, and transfer the selected data to the second memory device or store the selected data at a different physical location of the first memory device selectively depending on an update count (UC) of an address at which the selected data is stored.

2. The data storage device of claim 1, further comprising a request separator configured to classify a property of data requested from outside into the first property or the second property.

3. The data storage device of claim 2, wherein the request separator comprises:
a first selection circuit configured to classify the property of the data requested from outside into the first property or the second property depending on a length of the data requested from outside; and
a second selection circuit configured to reclassify a property of data, which has been classified into the second property by the first selection circuit, into the first property or the second property depending on a request count of the data to be reclassified.

4. The data storage device of claim 3, wherein the second selection circuit comprises:
a storage unit configured to sequentially store addresses of the data requested from outside according to a request sequence; and
a selection controller configured to reclassify data corresponding to a predetermined number of addresses stored in the storage unit into data having the first property.

5. The data storage device of claim 1, further comprising:
a first buffer configured to temporarily store the data having the first property; and
a second buffer configured to temporarily store data that is to be transferred to the second memory device from the first memory device.

6. The data storage device of claim 1, wherein the first memory device stores the UC.

7. The data storage device of claim 1, wherein the selected data comprises data that has not been used for the longest time among data stored in the first memory device.

8. The data storage device of claim 1, wherein the controller transfers data stored at the certain physical location, which has a UC equal to or less than a threshold value, to the second memory device.

9. The data storage device of claim 1, wherein the controller stores data stored at the certain physical location, which has a UC greater than a threshold value, at the different physical location of the first memory device.

10. The data storage device of claim 1, wherein the first memory device includes single-level cells (SLCs), and the second memory device includes multi-level cells (MLCs).

11. The data storage device of claim 1, wherein at least one of the first and second memory devices comprises a nonvolatile memory device.

12. An operating method of a data storage device, the operating method comprising:
selecting one or more data in a first memory device that stores data having a first property; and
transferring the selected data to a second memory device that stores data having a second property, based on a result of comparing a UC corresponding to an address of the selected data with a threshold value.

13. The operating method of claim 12, further comprising:
classifying a property of data requested from outside into the first property or the second property; and
storing data whose property is classified into the first property in the first memory device, and storing data whose property is classified into the second property in the second memory device.

14. The operating method of claim 13, wherein classifying the property of the data comprises:
a first step of classifying the data requested from outside into the first property or the second property depending on a length of the data requested from outside; and
a second step of reclassifying a property of data whose property has been classified into the second property at the first step into the first property or the second property depending on a UC of the data.

15. The operating method of claim 14, wherein the second step comprises:
sequentially storing addresses of the data requested from outside in a storage unit having a predetermined length according to a request sequence; and
reclassifying data corresponding to a predetermined number of addresses stored in the storage unit into data having the first property.

16. The operating method of claim 12, wherein transferring the selected data comprises transferring the selected data to the second memory device when the UC corresponding to the address of the selected data is equal to or less than the threshold value.

17. The operating method of claim 16, further comprising storing the selected data at a different physical location of the first memory device when the UC corresponding to the address of the selected data exceeds the threshold value.

18. The operating method of claim 17, further comprising resetting the UC corresponding to the address of the selected data stored in the first memory device after storing the selected data at the different physical location of the first memory device.

19. The operating method of claim 12, further comprising, when new data, which corresponds to an address where valid data exists in the first memory device, is written, increasing a UC corresponding to said address.

20. The operating method of claim 12, wherein selecting the one or more data comprises selecting one or more data including data that has not been used for the longest time among data stored in the first memory device.

21. A data storage device comprising:
a request separator configured to classify a property of data requested from outside into a first property or a second property;
a first memory device configured to store data having the first property; and
a second memory device configured to store data having the second property,
wherein the request separator comprises:
a first selection circuit configured to classify the property of the data requested from outside into the first property or the second property depending on a length of the data; and
a second selection circuit configured to reclassify a property of data, which has been classified into the second property by the first selection circuit, into the first property or the second property depending on a UC of the data to be reclassified.

22. The data storage device of claim 21, wherein the second selection circuit comprises:
a storage unit configured to sequentially store addresses of the data requested from outside according to a request sequence; and
a selection controller configured to reclassify data corresponding to a predetermined number of addresses stored in the first storage into data having the first property.

* * * * *